United States Patent Office 3,249,852
Patented May 3, 1966

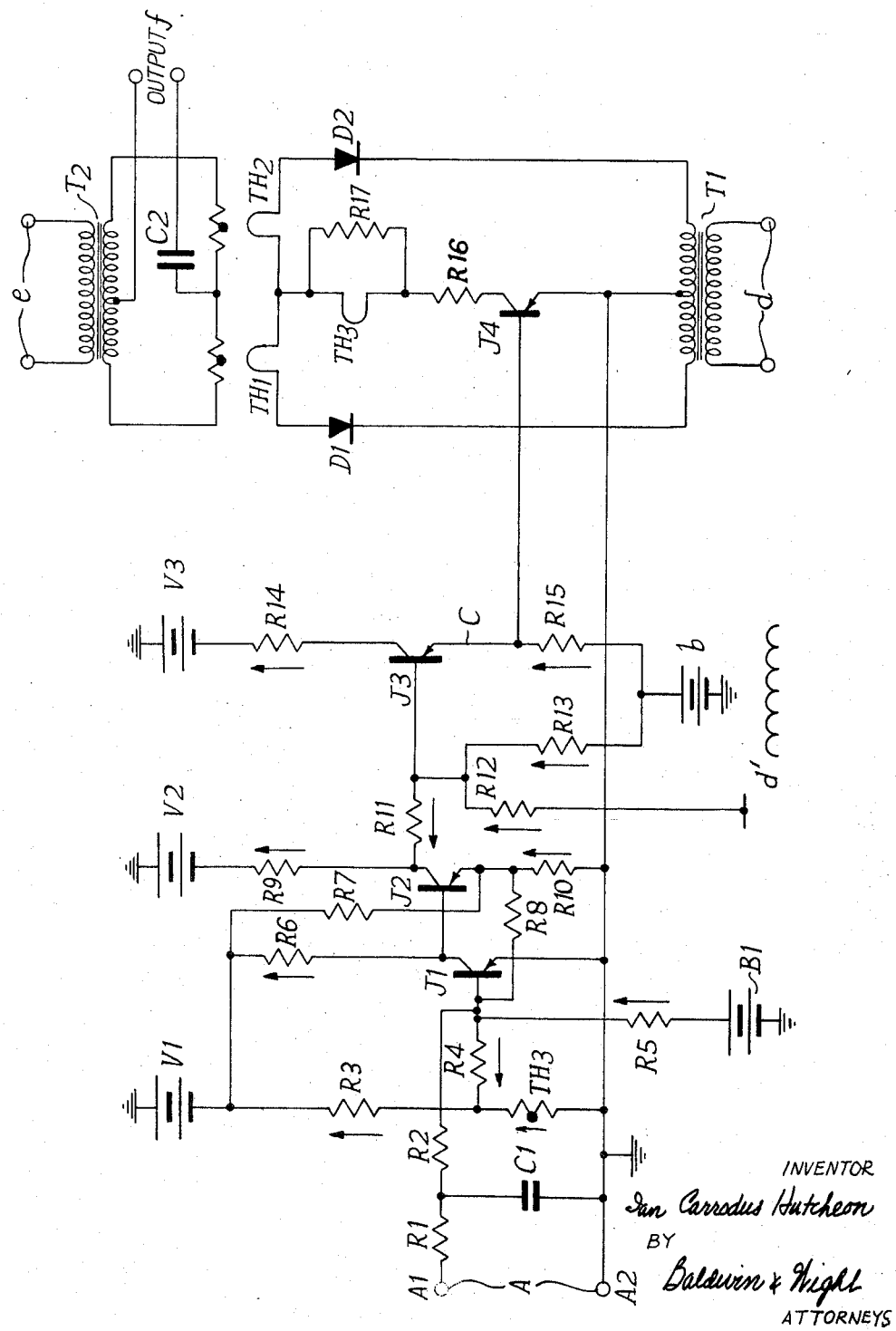

3,249,852
A.C. REGULATOR SYSTEMS
Ian Carrodus Hutcheon, Luton, England, assignor to George Kent Limited, Luton, England, a British company
Filed Sept. 11, 1963, Ser. No. 308,102
Claims priority, application Great Britain, Apr. 21, 1959, 13,560/59
12 Claims. (Cl. 323—69)

This application is a continuation-in-part of my application Serial No. 14,446 filed March 11, 1960, now abandoned.

This invention relates to the amplification and demodulation of A.C. signals for the purpose of providing a variable resistive output for use in the control of an A.C. or a D.C. signal. An example of the use of the invention would be in an A.C. servo system for the purpose of quadrature signal suppression, in which the invention provides a negative feedback path around the A.C. servo responsive only to quadrature signals. Alternatively the invention may be used in a servo configuration to constitute a solid-state multiplier analogous to the well-known servo potentiometer multiplier in which one potentiometer is time-shared between circuits. Further, in a similar manner the invention may constitute another type of multiplier in which by means of another well-known method, one potentiometer is shared by several signals of differing frequency.

It is an object of the invention to provide a regulator circuit in which a pair of thermistors is arranged to provide a resistive voltage divider the ratio of which is controlled by an A.C. signal. It is a further object of the invention to make use of the temperature-responsive characteristics of a further thermistor in such manner as to compensate the voltage divider for the effects of changes in the ambient temperature whereby the characteristics of the voltage divider are substantially unaffected by such changes. It is preferred to connect such a compensating thermistor so as to control the power supplied to the voltage divider thermistors and in a case in which the voltage divider is used in conjunction with an A.C. signal amplifier and demodulator employing transistors, the compensating thermistor is connected to develop a D.C. feedback to the input to the amplifier which is direct-coupled so as thereby also to compensate for the effects of ambient temperature changes on the transistors.

Accordingly a regulator system in accordance with the invention comprises a bridge circuit including a pair of thermistor heaters, each connected in a separate one of the branches of said bridge circuit, first source means for applying an alternating current signal to two diagonally opposite points on said bridge circuit, means for applying an unbalancing signal to the branches of said bridge circuit containing said thermistor heaters, said system further including second source means, a network in which said second source means and the beads of said thermistors are connected and means for deriving an output from said network.

Such a regulator system may further comprise a third thermistor heater connected in series with said unbalancing means between said diagonally opposite terminals of said bridge circuit, said unbalancing means including a phase-sense selective demodulating circuit, and said third thermistor having its bead connected in circuit with said unbalancing means to define a negative feedback path around a loop including said phase-sense selective demodulating circuit.

The invention is illustrated by way of example, by the single figure of the accompanying drawing, which figure is a diagram of an amplifying and demodulating system designed for use as a feedback quadrature suppressor in an A.C. servo system.

The amplifying and demodulating system illustrated includes a transistor J1 the emitter of which is connected to earth and the collector of which is connected through a resistor R6 to the negative terminal of a source of electric current V1 the positive terminal of which is connected to earth. The base electrode of the transistor J1 is connected through resistors R1 and R2 to an input terminal A1 and the junction between the resistors R1 and R2 is connected to one terminal of a capacitor C1 the other terminal of which is connected to earth. A second input terminal A2 is connected to earth.

The base electrode of the transistor J1 is connected to the junction of a pair of resistors R4 and R5 which constitute part of a voltage divider which also includes a resistor R3 and the bead of a thermistor TH3. The said voltage divider is connected between the negative terminal of the source V1 and the positive terminal of a source of bias current B1.

The collector of the transistor J1 is connected to the base electrode of a further transistor J2, the emitter of which is connected to the junction of a resistor R7 and a resistor R10. The emitter of the transistor J2 is also connected through a feedback resistor R8 to the base electrode of the transistor J1. The collector of the transistor J2 is connected through a resistor R9 to the negative terminal of a source of electric current V2 the positive terminal of which is connected to earth. The collector of the transistor J2 is also connected through a resistor R11 to the base electrode of a further transistor J3, the collector electrode of which is connected through a resistor R14 to the negative terminal of a further source of electric current V3 the positive terminal of which is connected to earth.

The emitter of the transistor J3 is connected through a resistor R15 to the positive terminal of a source of bias current $b$. The base electrode of the transistor J3 is connected through a resistor R13 to the positive terminal of the said bias source $b$ and through a resistor R12 to the output of a full-wave rectifier which produces a pulsating positive-going waveform $d'$.

The emitter of the transistor J3 is connected to the base electrode of a further transistor J4 the emitter of which is connected to earth and to the centre tape of the secondary winding of a transformer T1. The ends of the secondary winding of the transformer T1 are connected through diode rectifiers D1 and D2 to the series-connected heaters of a pair of thermistors TH1 and TH2. The collector of the transistor J4 is connected through resistors R16 and R17 to the junction of the heaters of the thermistors TH1 and TH2, and the heater of the thermistor TH3 is connected in parallel with the resistor R17.

The beads of thermistors TH1 and TH2 are connected in series across the ends of the secondary winding of a transformer T2 and the output terminals of the system are connected one to the centre tap of the secondary winding of the transformer T2 and the other through a capacitor C2 to the junction between the beads of the thermistors TH1 and TH2.

It is to be understood that in practice the various supply and bias currents would normally be provided by a single source rather than by the separate sources V1, V2, V3, B1 and $b$ illustrated in the drawings and that the representation used for the sake of clarity is to be regarded as purely diagrammatic.

The transistors J3 and J4 together operate as part of a demodulating circuit by virtue of the pulsating positive-going current $d'$ which is applied to the base electrode of the transistor J3 through the resistor R12. The pulses of current from the full-wave rectifier serve to cut off the transistor J3 so that current ceases to flow through the resistor R15 during these pulses. Thus this pulsating current has the effect of switching off the transistor J3 for a definite period of time during the peak of each of its positive excursions. The transistors J1 and J2 constitute the input amplifier of the system and the input signal A is applied between the terminals A1 and A2. The duration of the off period of the transistor J3 is determined by the algebraic sum of the said pulsating current $d'$, and the biasing action of two other direct currents one being a positive bias drawn through the resistor R13 and the other being a negative current drawn through the resistor R11. The current drawn through the resistor R11 is determined by the D.C. output of the input amplifier constituted by the transistors J1 and J2 and this output is determined by the resistance of the bead of thermistor TH3.

The transistor J4 is coupled to the transistor J3 so that it switches on and off in synchronism with the said transistor J3. The heaters TH1 and TH2 in series with the diodes D1 and D2 constitute a bridge circuit. If the transistor J4 is switched on the two arms of the bridge circuit carry current alternately each for the duration of one half cycle of an input voltage $d$ applied to the primary winding of the transformer T1. Thus, if the transistor J4 were switched on permanently, the heaters of the thermistors TH1 and TH2 would carry equal currents. However, by switching the transistor J4 on and off for portions of alternate half cycles of the voltage $d$ it is possible to cause differential heating of the heaters of these two thermistors.

The input $d$ to the transformer T1 is an A.C. reference supply voltage having the same frequency as the alternating current from which the pulsating waveform $d'$ is derived. Further there is a predetermined phase relationship between the reference supply $d$ and the said alternating current from which $d'$ is derived.

The beads of the thermistors TH1 and TH2 are connected as a potential divider across the output of the transformer T2 to the primary winding of which is applied an A.C. input $e$ so as to provide a final output $f$ which is dependent on the ratio between the resistance values of the beads of the two thermistors TH1 and TH2. The bead of the thermistor TH3 defines a negative feedback path around the amplifier and the phase-selective demodulating circuit and constitutes the means by which the total power supply to the thermistors TH1 and TH2 is defined so that the operation of the complete circuit is compensated for the effects of variations in the ambient temperature.

The A.C. signal A, which has the same frequency as the A.C. input $d$ for the transformer T1, is applied to the amplifier input transistor J1 through the phase-shifting network constituted by the resistors R1 and R2 and the capacitor C1. The input signal is amplified by the transistors J1 and J2 and is algebraically added at the base of the transistor J3 to the full-wave pulsating current $d'$ and the bias currents through the resistors R11 and R13. Since the signal current is alternating, it is added to one pulse of the bias current $d'$, and is subtracted from the next pulse. Thus it controls differentially the length of time in each half period of the A.C. reference supply $d$ when the transistors J3 and J4 are switched off. The two halves of the bridge network containing the heaters of the thermistors TH1 and TH2 are phase-sense selective and thus the input A differentially controls the power supply to said heaters. When there is no input A the power is shared equally, but when the input A is present it controls the ratio between the resistance values of the beads of the two thermistors TH1 and TH2.

The bias current applied to the base of the transistor J1 by the second potential divider is dependent on the resistance of the bead of the thermistor TH3 and thus controls the total power inputs to the thermistors TH1 and TH2. It may be noted that by this means not only are the ambient temperature effects on the thermistors TH1 and TH2 compensated but also any effects due to ambient temperature variations or changes in the characteristics of the transistors J1, J2, J3 and J4. It should also be noted that the bead of the thermistor TH3 responds to the average power supplied to its heater and the thermal lag between the heater and the bead ensures that the bead resistance does not fluctuate significantly with A.C. supplies of normal frequency.

The foregoing description is by way of example and the invention is not confined solely to the circuit arrangement illustrated. For example, the transistor J3 may be replaced by any known amplifier providing a push-pull output which can then be used to control a bridge circuit in which the transformer T1 secondary is connected in the diagonal. In this case the existing transistor J4 is replaced by two transistors driven by the push-pull output of the substituted amplifier and each constituting an arm of the bridge so that they differentially control the power through the heaters of TH1 and TH2.

Also the invention may be used to potentiometrically divide a D.C. signal instead of, or as well as, the A.C. input at $e$.

What I claim as my invention and desire to secure by Letters Patent of the United States is:

1. A regulator system comprising a bridge circuit including a pair of thermistor heaters, each connected in a separate one of the branches of said bridge circuit, first source means for applying an alternating current signal to two diagonally opposite points on said bridge circuit, means for applying an unbalancing signal to the branches of said bridge circuit containing said thermistor heaters, said system further including second source means, a network in which said second source means and the beads of said thermistors are connected and means for deriving an output from said network.

2. A regulator according to claim 1 further comprising a third thermistor heater connected in series with said unbalancing means between said diagonally opposite terminals of said bridge circuit, said unbalancing means including a phase-sense selective demodulating circuit, and said third thermistor having its bead connected in circuit with said unbalancing means to define a negative feedback path around a loop including said phase-sense selective demodulating circuit.

3. A regulator according to claim 2 further comprising transformer means having a primary winding and a secondary winding, said secondary winding constituting part of said network and being connected to the beads of said pair of thermistors.

4. A regulator comprising amplifying stages and a demodulating stage, a thermistor bead connected to the input of the amplifying stages, a bridge circuit connected to the output of the demodulating stages, the heater of said thermistor being connected in a diagonal of said bridge circuit, wherein a negative feedback system around a loop including said amplifying and demodulating stages is defined by said thermistor.

5. A regulator according to claim 4 further comprising a pair of thermistors, each having its heater winding connected in a separate branch of said bridge circuit.

6. A regulator according to claim 5 further comprising an output system connected to the beads of said pair of thermistors, said beads being arranged in a bridge circuit and means for applying an alternating current to said last mentioned bridge circuit.

7. A regulator according to claim 6 wherein said output system includes a transformer having primary and secondary windings, and wherein the secondary winding is connected to each of the beads of said pair of thermistors.

8. An A.C. signal demodulating amplifier the output circuit of which includes a pair of indirectly heated thermistors the beads of which are connected as a resistive voltage divider in circuit between a first alternating current source and a pair of output terminals and the heaters of which are connected in a bridge circuit to a second alternating current source, wherein amplifying means are provided for applying an unbalancing signal to said bridge circuit, and wherein said amplifying means include an additional thermistor arranged to compensate the voltage divider for changes in the ambient temperature.

9. A demodulating amplifier as claimed in claim 8, wherein the amplifying means comprise a direct-coupled transistor amplifier, and wherein the additional thermistor is connected to provide a negative D.C. feedback to the input of said transistor amplifier so as thereby to compensate also for variation in the D.C. characteristics of the transistors.

10. A regulator including a direct-coupled negative-feedback transistor amplifier, a demodulator fed by the amplifier, and an output circuit including a pair of indirectly-heated thermistors the beads of which are connected in a bridge circuit controlled by the output of the demodulator and a further indirectly-heated thermistor the heater of which is controlled by the output of the demodulator and the bead of which is connected in the negative feedback circuit of the amplifier.

11. A regulator as claimed in claim 10, wherein the heaters of the pair of indirectly-heated thermistors are connected in series in a bridge circuit, wherein alternating current is applied to two diagonally opposite points in said bridge, and wherein the demodulator applies an unbalancing signal to the branches of the bridge containing said thermistor heaters.

12. A regulator as claimed in claim 10, wherein the bridge circuit includes the centre-tapped secondary winding of a transformer and a pair of rectifiers each connected between a respective one of the ends of said secondary winding and a respective one of said thermistor heaters, wherein the demodulator includes a pair of transistors the emitter-collector path of one of which is connected in series with the heater of the additional thermistor between the junction of said thermistor heaters and the centre tap of said secondary winding, and wherein the output of the said amplifier is coupled to the base of the other of said transistors.

References Cited by the Examiner

UNITED STATES PATENTS

| | | | |
|---|---|---|---|
| 2,700,829 | 2/1955 | Statsinger | 323—69 X |
| 2,927,259 | 3/1960 | Neal | 323—75 X |
| 3,191,068 | 6/1965 | Robb | 323—69 X |

LLOYD McCOLLUM, *Primary Examiner.*

A. D. PELLINEN, *Assistant Examiner.*